United States Patent
Olvera-Hernandez (10) Patent No.: US 8,031,741 B2
(45) Date of Patent: Oct. 4, 2011

(54) METHOD AND APPARATUS FOR FACILITATING INTER-NETWORK HANDOVER

(75) Inventor: Ulises Olvera-Hernandez, Kirkland (CA)

(73) Assignee: InterDigital Technology Corporation, Wilmington, DE (US)

( * ) Notice: Subject to any disclaimer, the term of this patent is extended or adjusted under 35 U.S.C. 154(b) by 969 days.

(21) Appl. No.: 11/782,926

(22) Filed: Jul. 25, 2007

(65) Prior Publication Data

US 2008/0026757 A1    Jan. 31, 2008

Related U.S. Application Data

(60) Provisional application No. 60/820,554, filed on Jul. 27, 2006.

(51) Int. Cl.
*H04J 3/16* (2006.01)

(52) U.S. Cl. ...................................................... 370/466

(58) Field of Classification Search ....... 455/554.1–557, 455/88; 370/465–467, 469, 401–405, 419–420
See application file for complete search history.

(56) References Cited

U.S. PATENT DOCUMENTS

| 7,483,984 B1 | 1/2009 | Jonker et al. | |
|---|---|---|---|
| 2005/0025182 A1 | 2/2005 | Nazari | |
| 2007/0072611 A1* | 3/2007 | Feder et al. | 455/436 |
| 2007/0173283 A1* | 7/2007 | Livet et al. | 455/552.1 |

FOREIGN PATENT DOCUMENTS

| WO | 2004/014101 | 2/2004 |
|---|---|---|
| WO | 2004/021620 | 3/2004 |
| WO | 2004/077753 | 9/2004 |

OTHER PUBLICATIONS

3GPP Liaison Package Development Ad Hoc Group, "Proposed IEEE 802.21 Presentation for 3GPP", (Sep. 20, 2005).
Joint Harmonized Contribution, "Media Independent Handover", IEEE 802.21 Media Independent Handover Services, (May 2005).
LAN MAN Standards Committee of the IEEE Computer Society, "Draft IEEE Standard for Local and Metropolitan Area Networks: Media Independent Handover Services", IEEE P802.21/D01.00 (Mar. 2006).
LAN MAN Standards Committee of the IEEE Computer Society, "Draft IEEE Standard for Local and Metropolitan Area Networks: Media Independent Handover Services", IEEE P802.21/D03.00 (Dec. 2006).
Olvera, "Media Independent Handover Functions and Services Specification", IEEE 802.21 MIHO, (Jan. 9, 2006).
Olvera, "Media Independent Handover Functions and Services Specification", IEEE 802.21 MIHO, (Jul. 17, 2006).
Tanenbaum, Computer Networks, Issue 4, p. 555 (2003).
Third Generation Partnership Project, "Technical Specification Group Core Network; Mobile Radio Interface Signalling Layer 3: General Aspects (Release 6)", 3GPP TS 24.007 V6.5.0 (Sep. 2005).
Third Generation Partnership Project, "Technical Specification Group Core Network; Mobile Radio Interface Signalling Layer 3: General Aspects (Release 7)", 3GPP TS 24.007 V7.0.0 (Sep. 2005).
Third Generation Partnership Project, "Technical Specification Group Services and System Aspects; 3GPP System Architecture Evolution: Report on Technical Options and Conclusions (Release 7)", 3GPP TR 23.882 V1.9.0 (Mar. 2007).
Third Generation Partnership Project, "Technical Specification Group Services and System Aspects; 3GPP System Architecture Evolution: Report on Technical Options and Conclusions (Release 7)", 3GPP TR 23.882 V1.3.0 (Jul. 2006).

* cited by examiner

*Primary Examiner* — Thai Hoang
(74) *Attorney, Agent, or Firm* — Volpe and Koenig, P.C.

(57) ABSTRACT

A method and apparatus for facilitating inter-network handover comprises receiving a first network service primitive. The first network service primitive is then mapped to a second network service primitive.

16 Claims, 5 Drawing Sheets

METHOD AND APPARATUS FOR FACILITATING INTER-NETWORK HANDOVER

CROSS REFERENCE TO RELATED APPLICATION

This application claims the benefit of U.S. Provisional Application No. 60/820,554, filed Jul. 27, 2006 which is incorporated herein by reference as if fully set forth.

FIELD OF INVENTION

The present invention is related to wireless communication systems. More particularly, the present invention is related to a method and apparatus for facilitating inter-network handover.

BACKGROUND

The IEEE 802.21 group includes mechanisms and procedures that aid in the execution and management of inter-system handovers. In particular, IEEE 802.21 defines three main services that can be accessed by mobility management (MM) applications in order to aid in the management of handover operations and system discovery and system selection. Among these services are event service (ES), information service (IS) and command service (CS). All these services share an important characteristic in that they are delivered using a common uniform interface with respect to prospective users, regardless of the underlying access technologies that support the communication with respect to the core network.

The delivery of event services and the generation of commands is typically determined by which event is be triggered based on the prevailing characteristics of the underlying technology. These underlying technologies may be 3GPP, 3GPP2 and IEEE-based wireless local area network (WLAN), (e.g., IEEE 802.11 or 802.16).

The IEEE 802.21 specification outlines various triggers and commands that are sent to and received from upper layers. However, the IEEE 802.21 specification does not describe how these events and commands are triggered and generated. There are no procedures or functionality to generate triggers toward upper layers, based on information provided by the 3GPP or 3GPP2 underlying layers. In particular, IEEE 802.21 does not describe how events and commands are triggered and generated when the underlying physical resources are based on 3GPP or 3GPP2 technology. Therefore, it is desirable to provide a method for generating these triggers.

SUMMARY

The present invention is related to a method and apparatus for facilitating inter-network handover. The method comprises receiving a first network service primitive. The first network service primitive is then mapped to a second network service primitive.

BRIEF DESCRIPTION OF THE DRAWINGS

A more detailed understanding of the invention may be had from the following description of a preferred embodiment, given by way of example and to be understood in conjunction with the accompanying drawings wherein.

DETAILED DESCRIPTION OF THE PREFERRED EMBODIMENTS

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node-B, a site controller, an access point (AP), or any other type of interfacing device capable of operating in a wireless environment.

The present invention is applicable to any wireless communication system including, but not limited to, IEEE 802 technologies, (e.g., 802.11 baseline, 802.11a, 802.11b, 802.11g, 802.11j, 802.11n, 802.16, and 802.21), cellular standards, (e.g., 3GPP or 3GPP2), and other standardized or proprietary wireless technologies, (e.g., Bluetooth, HIPERLAN/2, and the like).

Figure 1:
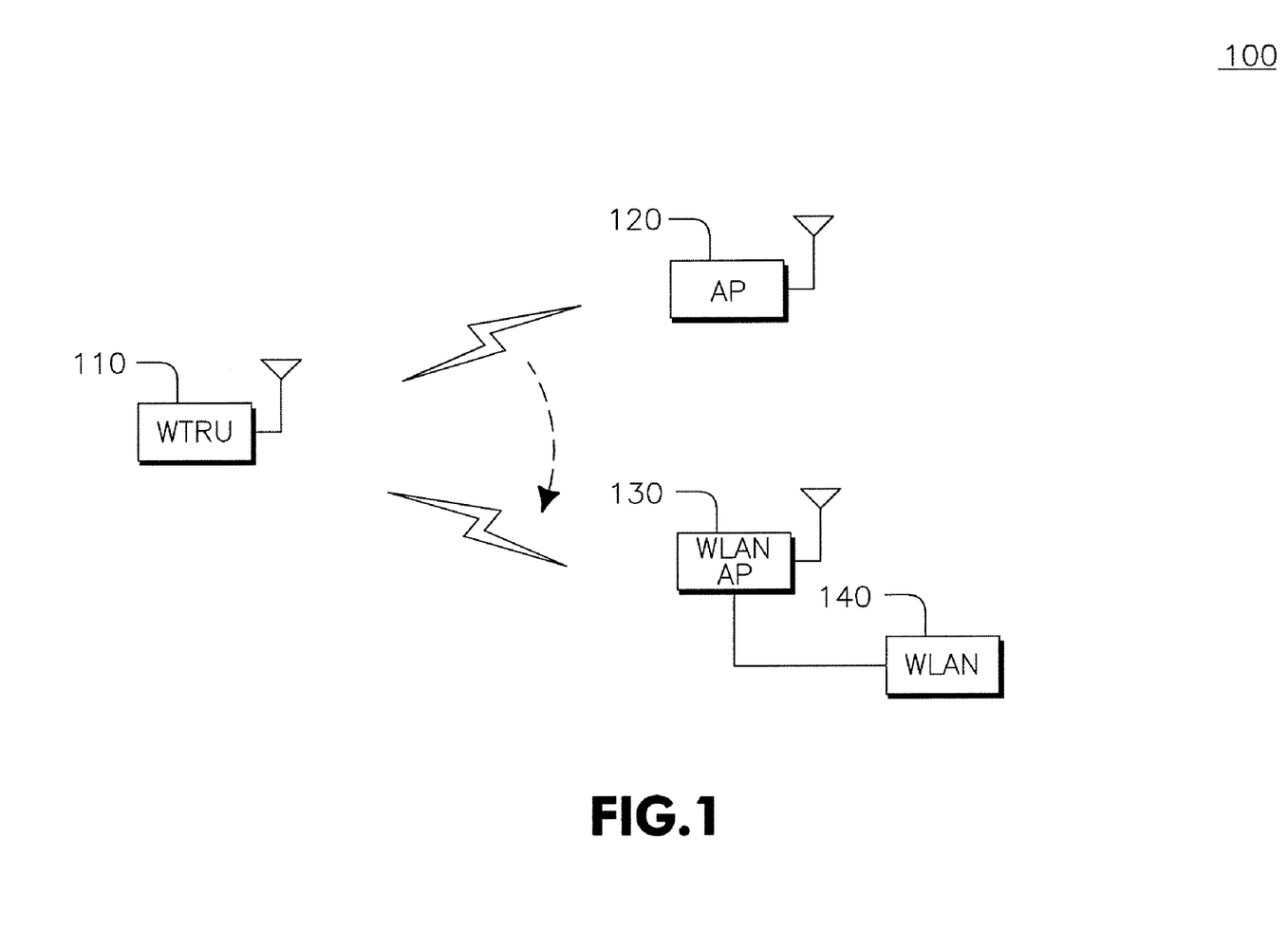
FIG. 1 shows an exemplary wireless communication system including a wireless transmit/receive unit (WTRU), access point (AP), and wireless local area network (WLAN) AP, configured in accordance with the present invention.

FIG. 1 shows an exemplary wireless communication system 100 including a WTRU 110, an AP 120, and a WLAN AP 530 configured in accordance with the present invention. In a preferred embodiment, the WLAN AP 530 is connected to a WLAN 540. As shown in FIG. 1, the WTRU 110 is in wireless communication with the AP 120, which is preferably a third generation partnership project (3GPP) access point, and transitioning during a handover to the WLAN AP 130. Although only one WTRU 110, one AP 120, and one WLAN AP 130 are shown in FIG. 1, it should be noted that any number and combination of wireless and wired devices may be included in the wireless communication system 100.

Figure 2:
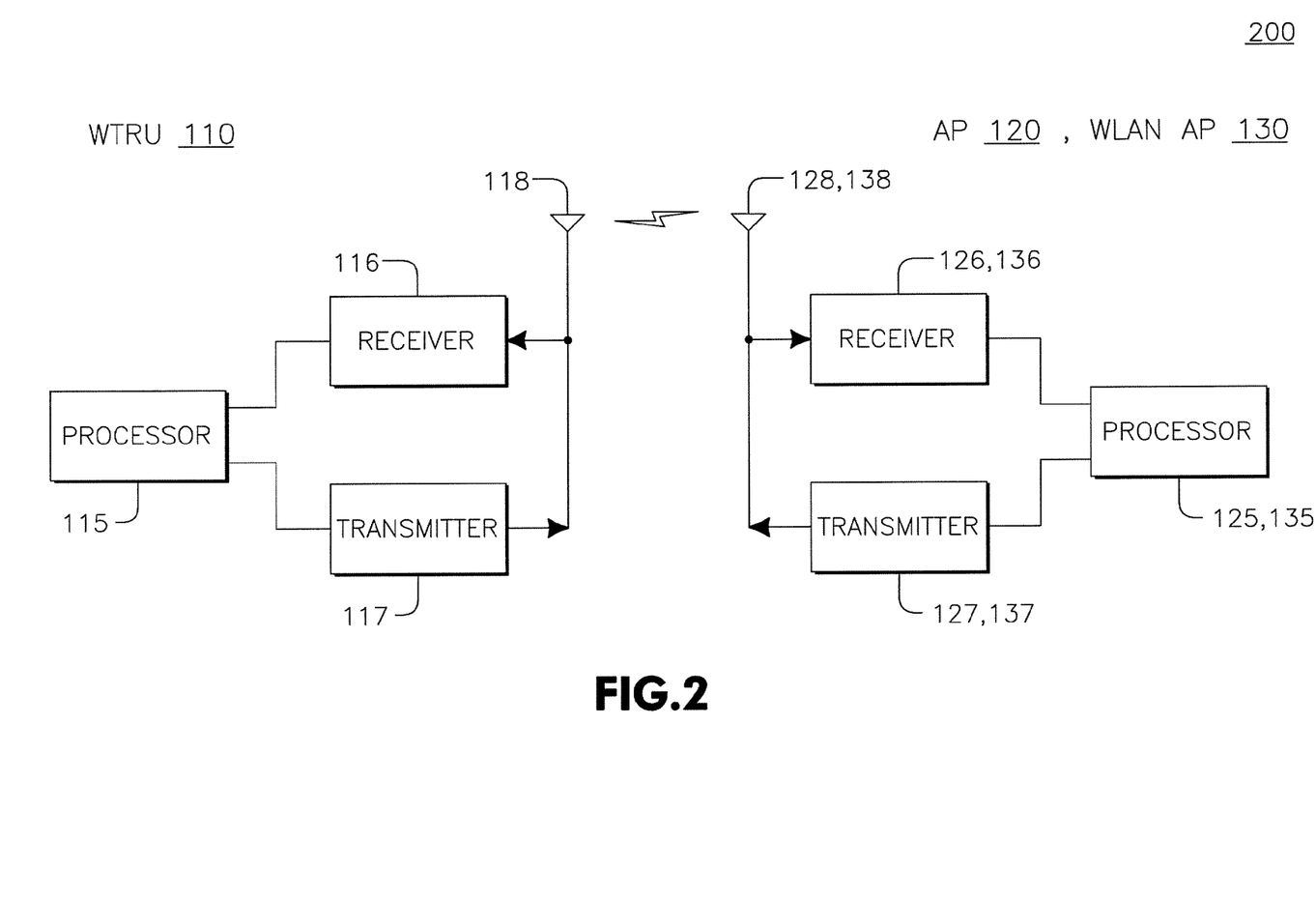
FIG. 2 is a functional block diagram of the WTRU and AP/WLAN AP of the wireless communication system of FIG. 1.

FIG. 2 is a functional block diagram 200 of the WTRU 110 and AP 120/WLAN AP 130 of the wireless communication system 100 of FIG. 1. As shown in FIG. 2, the WTRU 110 is in communication with the AP 120, the WLAN AP 130, or both, and all are configured to facilitate inter-network handover in accordance with the present invention. In a preferred embodiment of the present invention, the WTRU 110, AP 120, and WLAN AP 130 are configured to map events and commands from one network, (e.g., primitives in a 3GPP system), to events and commands in another network, (e.g., primitives in a WLAN network).

In addition to the components that may be found in a typical WTRU, the WTRU 110 includes a processor 115, a receiver 116, a transmitter 117, and an antenna 118. The processor 115 is configured to facilitate inter-network handover in accordance with the present invention. The receiver 116 and the transmitter 117 are in communication with the processor 115. The antenna 118 is in communication with both the receiver 116 and the transmitter 117 to facilitate the transmission and reception of wireless data.

In addition to the components that may be found in a typical AP, the AP 120 includes a processor 125, a receiver 126, a transmitter 127, and an antenna 128. The processor 115 is configured to facilitate inter-network handover in accordance with the present invention. The receiver 126 and the transmitter 127 are in communication with the processor 125. The antenna 128 is in communication with both the receiver 126 and the transmitter 127 to facilitate the transmission and reception of wireless data.

Similarly, in addition to the components that may be found in a typical WLAN AP, the WLAN AP 130 includes a processor 135, a receiver 136, a transmitter 137, and an antenna 138. The processor 135 is configured to facilitate inter-network handover in accordance with the present invention. The receiver 136 and the transmitter 137 are in communication with the processor 135. The antenna 138 is in communication with both the receiver 136 and the transmitter 137 to facilitate the transmission and reception of wireless data.

Figure 3:
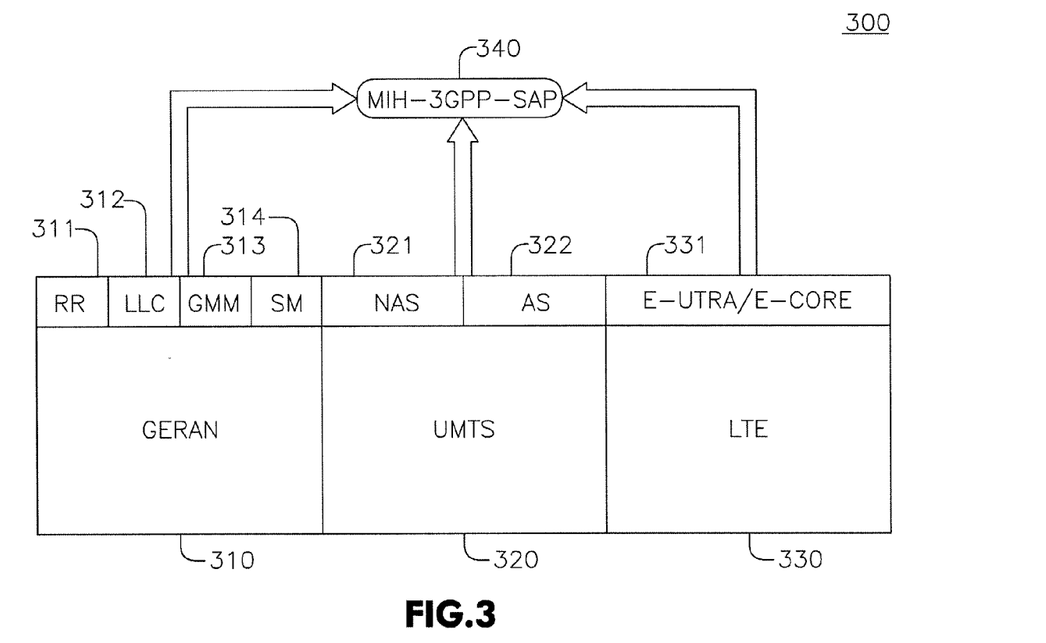
FIG. 3 is a functional block diagram of a mapping model in accordance with the present invention.

FIG. 3 is a functional block diagram of a mapping model 300 in accordance with the present invention. The mapping model 300 shows schematically a global system for mobile communication enhanced data rate for global evolution radio access network (GERAN) 310, a universal mobile telecommunications system (UMTS) 320, and a long term evolution (LTE) system 330. The GERAN 310 includes a radio resource (RR) protocol layer 311, a logical link control (LLC) protocol layer 312, a general packet radio service mobility management (GMM) protocol layer 313, and a session management (SM) layer 314. The UMTS 320 includes a non access stratum (NAS) layer 321 and an access stratum (AS) layer 322. The LTE system 330 includes an evolved universal terrestrial radio access/evolved-CORE (E-UTRA/E-CORE) layer 331. As shown in FIG. 3, events in the GERAN 310, UMTS 320, and LTE 330 may be mapped into a media independent handover (MIH)—3GPP—service access point (SAP) layer 340. Any relevant primitives then supported by a layer within a specific technology may be mapped to a corresponding counterpart within the 802.21 technology without being first interpreted by other layers.

Still referring to FIG. 3, the services within the different layers of the 3GPP technology may be accessed through the MIH-3GPP-SAP 340. Preferably, the service is delivered using a primitive defined within the 3GPP specifications and mapped to the corresponding 802.21 counterpart within the MIH function. Alternatively, the 3GPP primitive may be mapped through the use of AT commands or using an API.

Figure 4:
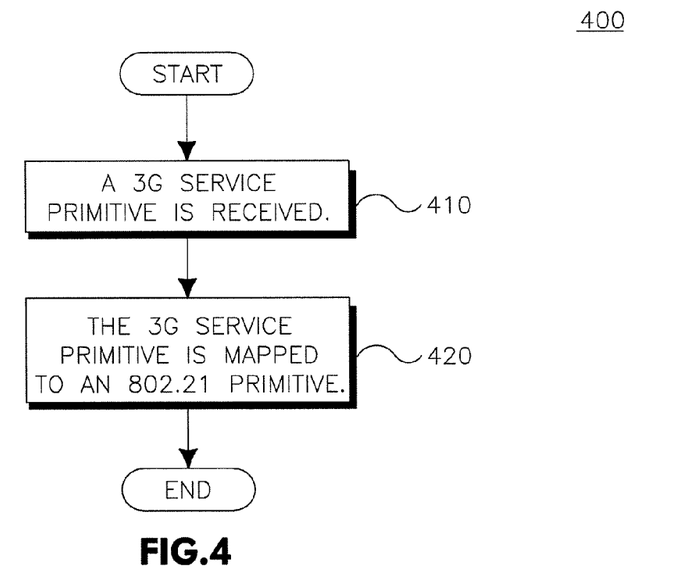
FIG. 4 is a flow diagram of a method for facilitating inter-network handover in accordance with the present invention.

FIG. 4 is a flow diagram of a method 400 for facilitating inter-network handover in accordance with the present invention. In step 410, a 3G service primitive is received. The 3G service primitive is then mapped to an IEEE 802.21 primitive or event (step 420). Although the method 400 depicts the mapping of a 3G service primitive to an 802.21 primitive or event, it should be noted that the mapping may also occur in the reverse direction and that the primitives are not limited to 3G service primitives and 802.21 primitives. Table 1 below in an exemplary table depicting the mapping of 3GPP primitives to 802.21 events.

TABLE 1

| 3GPP Layer | 3GPP Service Primitive Descriptions | 3GPP Primitive | 802.21 Event |
|---|---|---|---|
| RR | Page received by RR layer | GMRR-PAGE | Link Parameter Change |
|  | Successful reception of data supporting specific QoS | GRR-DATA | Link Parameter Change |
| LLC | Peer LLC layer is established | LL-ESTABLISH | Link Up/Link Parameter Change |
|  | Peer LLC layer is released | LL-RELEASE | Link Going Down/Link Parameter Change |
|  | LLC Layer unrecoverable error | LL-STATUS | Link Down |
| GMM | Station is attached | GMMREG-ATACH | Link Parameter Change |
|  | Station is detached | GMMREG-DETACH | Link Parameter Change |
| SM | Data session active | SMSM-ACTIVE | Link Up/Link Parameter Change |
|  | Data session is deactivated | SMSM-DEACTIVEATE | Link Down/Link Parameter Change |
|  | Data session modified | SMSM-MODIFY | Link Parameter Change |
|  | Data session terminated due to unrecoverable error | SMSM-STATUS | Link Down |
|  | PDP Context is active | SMREG-PDP-ACTIVATE | Link Up/Handover Complete/Parameter Change/Handover Complete |
|  | PDP Context is modified | SMREG-PDP-MODIFY | Link Up/Parameter Change/Handover Complete |
|  | PDP Context is deactivated | SMREG-PDP-DEACTIVATE | Link Going Down/Link Down |

TABLE 1-continued

| 3GPP Layer | 3GPP Service Primitive Descriptions | 3GPP Primitive | 802.21 Event |
| --- | --- | --- | --- |
| NAS | Station is attached | GMMREG-ATACH | Parameter Change |
| | Station is detached | GMMREG-DETACH | Parameter Change |
| | PDP Context is active | SMREG-PDP-ACTIVATE | Link Up/Handover Complete/Parameter Change |
| | PDP Context is modified | SMREG-PDP-MODIFY | Parameter Change/Link Up |
| | PDP Context is deactivated | SMREG-PDP-DEACTIVATE | Link Down/Link Parameter Change |
| | Radio Access Bearer is activated for data transfer | RABMSM-ACTIVATE | Link Up/Parameter Change/Handover Complete |
| | Radio Access Bearer is deactivated for data transfer | RABMSM-DEACTIVATE | Link Down/Link Parameter Change |
| | Radio Access Bearer is modified for data transfer | RABMSM-MODIFY | Parameter Change/Link Up/Handover Complete |
| | Radio Access Bearer data transfer error | RABMSM-STATUS | Link Down |
| AS | Radio Access Bearer has been activated | RABMAS-RAB-ESTABLISH | Link Up/Handover Complete |
| | Radio Access Bearer has been released | RABMAS-RAB-RELEASE | Link Down |
| | AS failure Indication | RABMAS-STATUS | Link Down |
| | Information regarding geographical area. | Information Broadcast | Parameter Change |
| | Notification of paging for particular user or terminal | Paging Request | Parameter Change |
| | Notification for all users | Notification Broadcast | Parameter Change |
| | Notification information for a specific or for many user | Notification Indication | Parameter Change |
| | UE initiated connection establishment | Connection Establishment | Link Up |
| | Network initiated connection release | IF Initiated Connection Release | Link Down |
| | Network initiated Radio Access Bearer Establishment | IF Side Initiated Radio Access Bearer Establishment | Link Up/Link Detected |
| | Network initiated Radio Access Bearer Release | IF Side Initiated Radio Access Bearer Release | Link Down |
| | Indication that the connection might be aborted unless streamlining is done | Streamlining Require Indication | Link Going Down |
| | Location information provided by the network for a specific UE | UE location information | Parameter Change |
| | Connection loss indications | Connection loss indication | Link Down |
| E-UTRAN/E-CORE* | The location of the UE is now know by the network | LTE-detached | Parameter Change |
| | The UE is known to the network but not transport channel is established | LTE-idle | Parameter Change/Link Down |
| | Radio resources have been established and the UE is able to perform uplink and downlink transport of PDU | LTE-Active | Link Up/Link Handover Complete |

Figure 5:
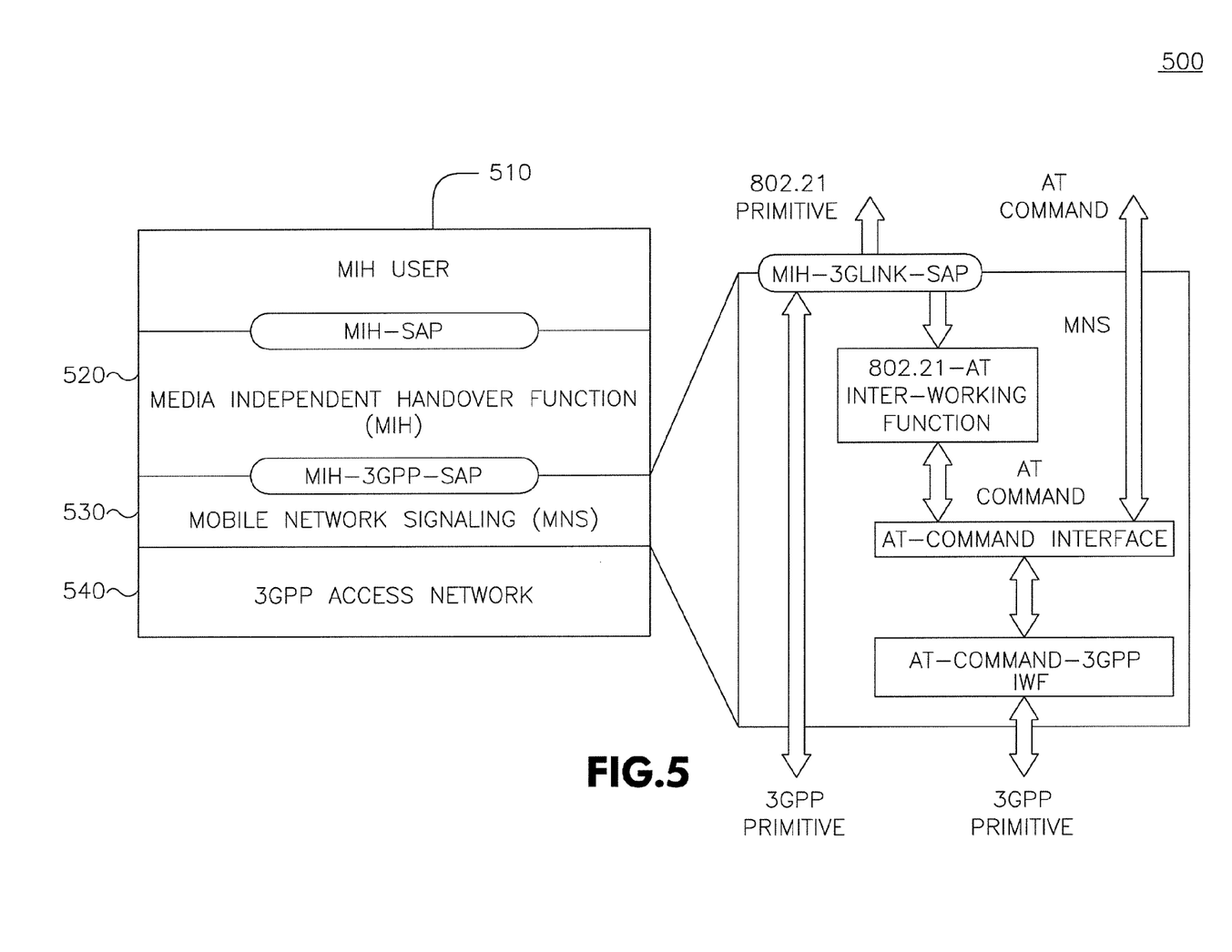
FIG. 5 is an exemplary graphical representation of an IEEE 802.21 command and event service mapping to 3GPP in accordance with the present invention.

FIG. 5 is an exemplary graphical representation of an IEEE 802.21 command and event service mapping to 3GPP 500 in accordance with the present invention. FIG. 5 shows an MIH user 510, an MIH functional layer 520, a mobile network signaling (MNS) layer 530, and a 3GPP access network 540. An MIH-SAP layer exists between the MIH user 510 and the MIH functional layer 520, and the MIH-3GPP-SAP layer exists between the MIH functional layer 520 and the MNS layer 530.

The MNS layer 530 includes an MIH-3GLINK-SAP layer, an 802.21-AT inter-working (IW) function layer, an AT-command interface, and an AT-command-3GPP IWF layer. As shown in FIG. 5, a 3GPP primitive is received at the AT-command-3GPP IWF layer which is in communication with the AT-command interface layer and generates an AT command. The AT command may be received by the 802.21-AT IWF layer where it is translated into a 3GPP primitive as expected by the MIH function. Alternatively, the 3GPP primitive could be received directly from the 3GPP access network 540. Upon receipt of the 3GPP primitive through the MIH-3GLINK-SAP layer, the MIH function 520 maps, or converts, the 3GPP primitive into an 802.21 primitive. Additionally, the MIH function may generate a corresponding media independent primitive toward the MIH user 510. Conversely, an 802.21 primitive is converted into a 3GPP primitive by a similar reverse process. Accordingly, the 3GPP primitive may be translated into an AT command or directly sent to the 3GPP access network, such as through the use of a function call that implements the 3GPP API.

Figure 6:
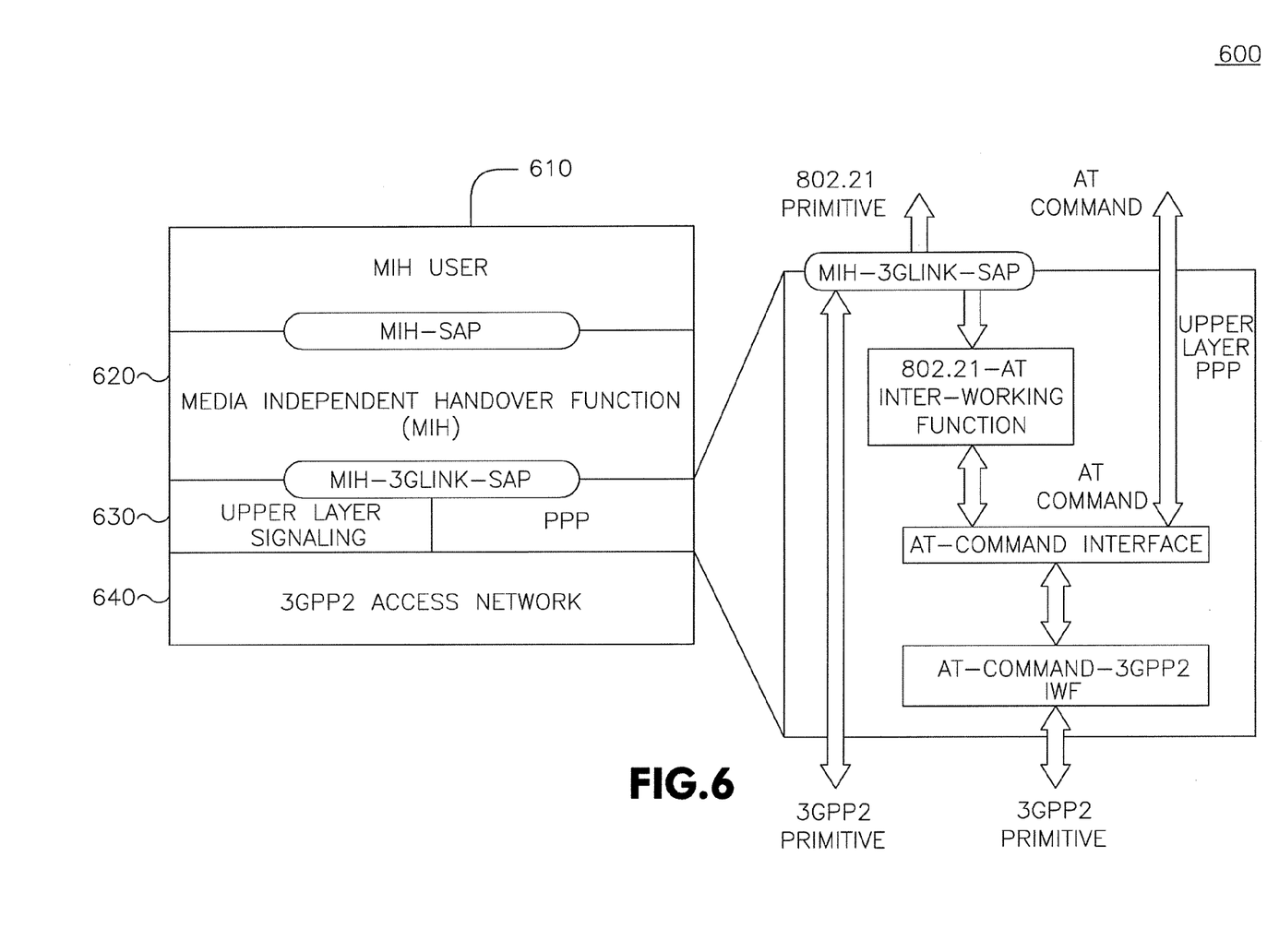
FIG. 6 is an exemplary graphical representation of an 802.21 command and event service mapping to 3GPP2 in accordance with the present invention.

FIG. 6 is an exemplary graphical representation of an IEEE 802.21 command and event service mapping to 3GPP2 600 in accordance with the present invention. FIG. 6 shows an MIH user 610, an MIH functional layer 620, upper layer signaling/point to point protocol (PPP) layer 630, and a 3GPP2 access network 640. An MIH-SAP layer exists between the MIH user 610 and the MIH functional layer 620, and the MIH-3GLINK-SAP layer exists between the MIH functional layer 620 and the upper layer/PPP layer 630.

The upper layer/PPP layer 630 includes an MIH-3GLINK-SAP layer, an 802.21-AT inter-working (IW) function layer, an AT-command interface, and an AT-command-3GPP2 IWF layer. As shown in FIG. 6, a 3GPP2 primitive is received at the AT-command-3GPP2 IWF layer which is in communication with the AT-command interface layer and generates an AT command. The AT command may be received by the 802.21-AT IWF layer where it is translated into a 3GPP2 primitive as expected by the MIH function. Alternatively, the 3GPP2 primitive could be received directly from the 3GPP2 access network 640. Upon receipt of the 3GPP2 primitive through the MIH-3GLINK-SAP layer, the MIH function 620 maps, or converts, the 3GPP2 primitive into an 802.21 primitive. Additionally, the MIH function may generate a corresponding media independent primitive toward the MIH user 610. Conversely, an 802.21 primitive is converted into a 3GPP2 primitive by a similar reverse process. Accordingly, the 3GPP2 primitive may be translated into an AT command or directly sent to the 3GPP2 access network, such as through the use of a function call that implements the 3GPP API.

Although the features and elements of the present invention are described in the preferred embodiments in particular combinations, each feature or element can be used alone without the other features and elements of the preferred embodiments or in various combinations with or without other features and elements of the present invention. The methods or flow charts provided in the present invention may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

What is claimed is:

1. A method for use in a wireless transmit/receive unit (WTRU), the method comprising:
    transmitting or receiving data via a wireless network;
    receiving an ATtention (AT) command related to the transmitting or receiving data via the wireless network;
    generating a first network service primitive based on the AT command;
    generating a second network service primitive based on the first network service primitive, wherein the second network service primitive is an Institute of Electrical and Electronics Engineers (IEEE) 802.21 primitive; and
    communicating second network service primitive to a higher layer.

2. The method of claim 1, wherein the generating the second network service primitive is performed by a media independent handover (MIH) function.

3. The method of claim 1, wherein the first network service primitive is a Third Generation Partnership Project (3GPP) service primitive.

4. The method of claim 3, wherein the first network service primitive includes at least one of: a radio resource (RR) service primitive, a mobility management (MM) service primitive, a session management (SM) service primitive, a long term evolution (LTE) service primitive, a system architecture (SAE) service primitive, a logical link control (LLC) service primitive, an access stratum (AS) service primitive, and a non access stratum (NAS) service primitive.

5. The method of claim 1, wherein the first network service primitive is a Third Generation Partnership Project 2 (3GPP2) service primitive.

6. The method of claim 1, further comprising:
    receiving a third network service primitive related to the transmitting or receiving data via the wireless network; and generating the AT command based on the third network service primitive.

7. The method of claim 6, wherein the third network service primitive is a 3GPP primitive.

8. The method of claim 6, wherein the third network service primitive is a 3GPP2 service primitive.

9. A wireless transmit/receive unit (WTRU) comprising:
circuitry configured to receive an ATtention (AT) command related to the communication of data via a wireless network;
circuitry configured to generate a first network service primitive based on the AT command;
circuitry configured to generate second network service primitive based on the AT command, wherein the second network service primitive is an Institute of Electrical and Electronics Engineers (IEEE) 802.21 primitive; and
circuitry configured to communicate the second network service primitive to a higher layer.

10. The WTRU of claim 9, wherein the generating the second network service primitive is performed by a media independent handover (MIH) function.

11. The WTRU of claim 9, wherein the first network service primitive is a Third Generation Partnership Project (3GPP) service primitive.

12. The WTRU of claim 11, wherein the first network service primitive includes at least one of: a radio resource (RR) service primitive, a mobility management (MM) service primitive, a session management (SM) service primitive, a long term evolution (LTE) service primitive, a system architecture (SAE) service primitive, a logical link control (LLC) service primitive, an access stratum (AS) service primitive, and a non access stratum (NAS) service primitive.

13. The WTRU of claim 9, wherein the first network service primitive is a Third Generation Partnership Project 2(3GPP2) service primitive.

14. The WTRU of claim 9, further comprising:
circuitry configured to receive a third network service primitive related to the communication of data via the wireless network; and
circuitry configured to generate the AT command based on the third network service primitive.

15. The WTRU of claim 14, wherein the third network service primitive is a 3GPP primitive.

16. The WTRU of claim 14, wherein the third network service primitive is a 3GPP2 service primitive.

* * * * *

UNITED STATES PATENT AND TRADEMARK OFFICE
CERTIFICATE OF CORRECTION

PATENT NO. : 8,031,741 B2  Page 1 of 1
APPLICATION NO. : 11/782926
DATED : October 4, 2011
INVENTOR(S) : Ulises Olvera-Hernandez

It is certified that error appears in the above-identified patent and that said Letters Patent is hereby corrected as shown below:

ON THE TITLE PAGE

At Section (56) OTHER PUBLICATIONS, page 1, right column, after "V1.3.0 (Jul. 2006). insert -- EUROPEAN TELECOMMUNICATIONS STANDARDS INSTITUTE,
"Digital Enhanced Cordless Telecommunications (DECT); AT command
interface; High-level description," ETSI TR 102 179 V1.1.1 (March 2003). --

Signed and Sealed this
Seventeenth Day of April, 2012

David J. Kappos
*Director of the United States Patent and Trademark Office*